(12) United States Patent
Webb et al.

(10) Patent No.: US 6,457,748 B1
(45) Date of Patent: Oct. 1, 2002

(54) FIRE-RESISTANT PIPE COUPLING

(75) Inventors: Ian Richard Webb, Buckinghamshire; William Taylor, deceased, late of Middlesex, by Brenda Taylor, legal representative; Neil John Thornton Taylor, Hertfordshire, all of (GB)

(73) Assignee: Taylor Kerr (Couplings) Ltd., London (GB)

( * ) Notice: Subject to any disclaimer, the term of this patent is extended or adjusted under 35 U.S.C. 154(b) by 0 days.

(21) Appl. No.: 09/194,627

(22) PCT Filed: Jun. 2, 1997

(86) PCT No.: PCT/GB97/01482

§ 371 (c)(1),
(2), (4) Date: Sep. 7, 1999

(87) PCT Pub. No.: WO97/45670

PCT Pub. Date: Dec. 4, 1997

(30) Foreign Application Priority Data

May 31, 1996 (GB) ............................................ 9611410

(51) Int. Cl.[7] ................................................. F16L 11/21
(52) U.S. Cl. ............................ 285/47; 285/369; 285/53
(58) Field of Search ................................. 285/369, 372, 285/373, 340, 47, 53

(56) References Cited

U.S. PATENT DOCUMENTS

| 1,683,076 | A |   | 9/1928  | Johnson et al.   |         |
|-----------|---|---|---------|------------------|---------|
| 2,201,372 | A |   | 5/1940  | Miller           |         |
| 2,632,450 | A |   | 3/1953  | Allen            |         |
| 3,185,504 | A |   | 5/1965  | Perrot et al.    |         |
| 3,454,287 | A |   | 7/1969  | Thiessen         |         |
| 3,565,468 | A |   | 2/1971  | Garrett          |         |
| 3,680,894 | A |   | 8/1972  | Young            |         |
| 3,801,141 | A |   | 4/1974  | Hollingsworth    |         |
| 3,851,901 | A |   | 12/1974 | Sills            |         |
| 3,877,733 | A |   | 4/1975  | Straub           |         |
| 3,977,705 | A |   | 8/1976  | Thiessen et al.  |         |
| 4,108,479 | A |   | 8/1978  | Straub           |         |
| 4,119,333 | A |   | 10/1978 | Straub           |         |
| 4,186,948 | A |   | 2/1980  | Cronk            |         |
| 4,345,430 | A | * | 8/1982  | Pallo et al.     | 285/47  |
| 4,367,889 | A | * | 1/1983  | Redl             |         |
| 4,413,683 | A | * | 11/1983 | Hune             | 283/47  |
| 4,480,860 | A |   | 11/1984 | Foresta et al.   |         |
| 4,518,177 | A |   | 5/1985  | Deakins          |         |
| 4,583,770 | A |   | 4/1986  | Kreku et al.     |         |
| 4,627,645 | A |   | 12/1986 | Sauer            |         |
| 4,629,217 | A | * | 12/1986 | Straub           |         |
| 4,671,541 | A |   | 6/1987  | Webb et al.      |         |
| 5,056,833 | A |   | 10/1991 | Webb et al.      |         |
| 5,280,970 | A |   | 1/1994  | Straub           |         |
| 5,351,997 | A | * | 10/1994 | Webb et al.      |         |
| 5,390,962 | A |   | 2/1995  | Sekiguchi et al. |         |
| 5,772,257 | A | * | 6/1998  | Webb et al.      |         |

FOREIGN PATENT DOCUMENTS

AT      1 582 858      *   1/1981

(List continued on next page.)

Primary Examiner—Lynne H. Browne
Assistant Examiner—Ernesto Garcia
(74) Attorney, Agent, or Firm—Flynn, Thiel, Boutell & Tanis, P.C.

(57) ABSTRACT

A pipe coupling for coupling together two pipes in a fluid-tight manner includes a tubular casing, a tubular sealing gasket located within the casing, and screws for tensioning the casing around the gasket. The casing includes an inner tubular casing and an outer tubular casing, both of metal. A layer of fire-resistant thermally-insulating material is disposed between the inner and outer casings to form a fire shield.

25 Claims, 3 Drawing Sheets

FOREIGN PATENT DOCUMENTS

| | | | |
|---|---|---|---|
| AU | 58053/86 | | 5/1988 |
| AU | 60973/86 | | 1/1989 |
| AU | B-60973/86 | * | 12/1989 |
| DE | 3301 229 A1 | | 7/1984 |
| DE | 3301229 | * | 7/1984 |
| DE | 3421 605 A1 | | 12/1985 |
| DE | 3445 807 A1 | | 6/1986 |
| DE | 3926626 | * | 10/1990 |
| EP | 079 457 | | 5/1983 |
| EP | 180 824 | | 5/1986 |
| FR | 2 359 354 | | 2/1978 |
| FR | 2 359 355 | | 2/1978 |
| FR | 2 436 929 | | 4/1980 |
| GB | 995 409 | | 6/1965 |
| GB | 1 010 664 | | 11/1965 |
| GB | 1 214 847 | | 12/1970 |
| GB | 1 582 859 | | 1/1981 |
| GB | 2 167 145 A | | 5/1986 |
| GB | 2 186 651 A | | 5/1986 |
| GB | 2 227 068 A | | 7/1990 |
| IT | 594113 | | 3/1959 |
| NL | 6406152 | | 1/1965 |
| NZ | 135 474 | | 7/1963 |
| NZ | 166 564 | | 3/1973 |
| NZ | 183 015 | | 1/1977 |
| NZ | 218 779 | | 12/1986 |
| SE | 207 900 | | 10/1966 |
| WO | WO95/11402 | | 4/1995 |

* cited by examiner

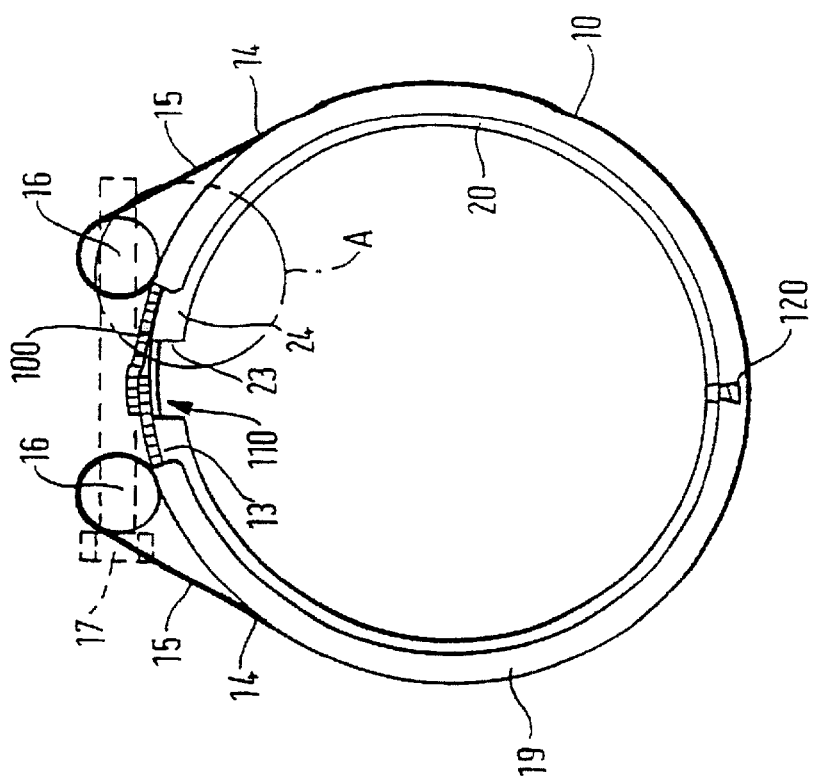
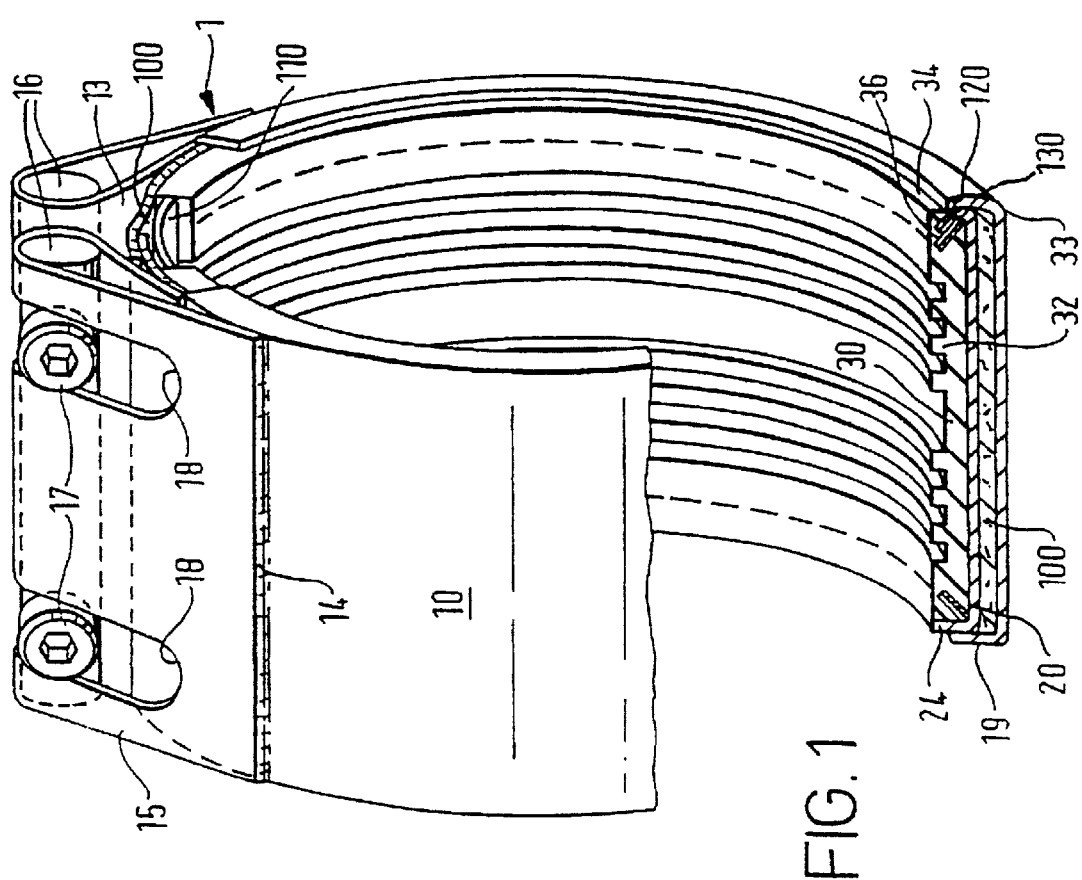
FIG. 1
FIG. 2

FIRE-RESISTANT PIPE COUPLING

FIELD OF THE INVENTION

The present invention relates to pipe couplings for connecting together two plain-ended pipes in a fluid-tight manner, of the type consisting of a tubular casing formed with a longitudinal gap, a sealing gasket of resilient flexible material typically of rubber or synthetic rubber, arranged within the casing, and tensioning means for reducing the width of the longitudinal gap so as to tighten the casing around the gasket. In use, the sealing sleeve is placed around the adjacent pipe ends and the tensioning means are tightened to clamp the sleeve against the outer surfaces of the pipe ends to form a fluid tight seal.

BACKGROUND OF THE INVENTION

One known pipe coupling of this type is described in our patent specification EP-A-0542779.

Joining together pipes with plain ends with such couplings avoids the need for pipe preparation and is therefore quicker and more economical than other methods such as welding, screw threading, flanging, grooving or shouldering.

In the coupling of the above-mentioned patent specification, the sealing gasket has circumferential slots and a gripping ring with inwardly projecting gripping teeth in each slot. In use when the tensioning means are tightened around the casing the gripping teeth penetrate the sealing gasket at the bottom of the slot and engage the outer surface of the pipe to hold the pipe ends against axial displacement.

Couplings of the type described above are often required for use in systems where resistance to fire is required. For such applications the coupling may have to pass a specific fire test. Fire tests often require the coupling to perform when subjected to a flame temperature of, typically 800° C. and under a variety of simulated pipeline conditions. The test conditions depend on the testing authority and/or the intended field of application. For some tests the pipes will be empty, for others they will be pressurized with cold water or with hot water at, typically, 80° C. After the test, which is typically of 30 minutes duration, the coupling will usually be expected to withstand a pressure test to the published maximum test pressure—typically 24 bars.

The known pipe couplings cope extremely well with most of these test by virtue of the fact that within the time span of the test, the rubber gaskets do not exceed the temperature performance limitations whereby the rubber will melt, revert or decompose and thus lose its sealing ability. In general, provided the gasket remains below, say 250° C., for the duration of the test, it will not fail.

There are some fire tests, particularly for sprinkler systems, where the pipes must be empty for the duration of the test and thus the rubber is not cooled by the internal pipe medium. Recently introduced new higher marine standards have meant that the coupling has to withstand flames of greater intensity or temperature than was previously required. This is generally reflective of a raising of standards in the shipping industry.

There is a requirement for a pipe coupling that can meet the higher fire performance requirements whilst retaining the advantages of the known gasketed mechanical coupling of time saving in installation, flexibility and ease of installation. One possibility is to wrap the coupling, after installation, with mineral wool and fire-shielding fabrics in order to reduce the temperature within the coupling to less than the critical value of approximately 250° C. There are, however, severe drawbacks with this approach. The materials needed are extremely expensive; they have to be expertly prepared to a given formula ensuring a certain number of wraps and an exact thickness of material, to ensure the desired degree of protection; each size of coupling will require a different length of material, and in many cases materials will have to be pre-prepared to fit round the coupling rather than being cut in situ. Consequently, this solution is feasible but impractical.

According to the present invention a pipe coupling for coupling together two pipes in a fluid-tight manner comprises a tubular casing, a tubular sealing gasket located within the casing, and means for tensioning the is casing around the gasket, the casing comprising an inner tubular casing and an outer tubular casing, a layer of fire-resistant thermally-insulating material being disposed between the inner and outer casings.

The coupling of the invention combines the advantages of the fire-shielding materials with a pipe coupling such that the coupling maybe supplied complete with its own fire shield and be fitted in place without any further preparation. By placing a fire sleeve of, typically 3 mm–5 mm thickness between the inner and outer casing of the coupling such that when the coupling is tightened it will slide easily over the fire shield without rucking and close down around the pipe, a satisfactory fire performance can be achieved without affecting its other properties of sealing or anchoring the pipes.

The problems which have been solved in enabling this invention to work have been to reconcile the tolerance of the coupling to having an extra 6–10 mm of diameter between the pipe surface and the outer casing of the coupling, to ensure that the fire shield does not ruck when the coupling is closed, and to ensure that the coupling is protected fully about its entire circumference at all times.

The difference over previous couplings is so great that a coupling in accordance with the present invention has been constructed which can withstand temperatures of 950° C. without any deterioration. In unprotected couplings failure would occur under these conditions in less than 6 minutes.

BRIEF DESCRIPTION OF THE DRAWINGS

An embodiment of the invention will now be described, by way of example, with reference to the accompanying drawings, of which:

FIG. 1 shows a perspective cut-away view of a coupling in accordance with the invention;

FIG. 2 shows an end view of the coupling of FIG. 1;

DESCRIPTION OF THE PREFERRED EMBODIMENT

Figure 4:
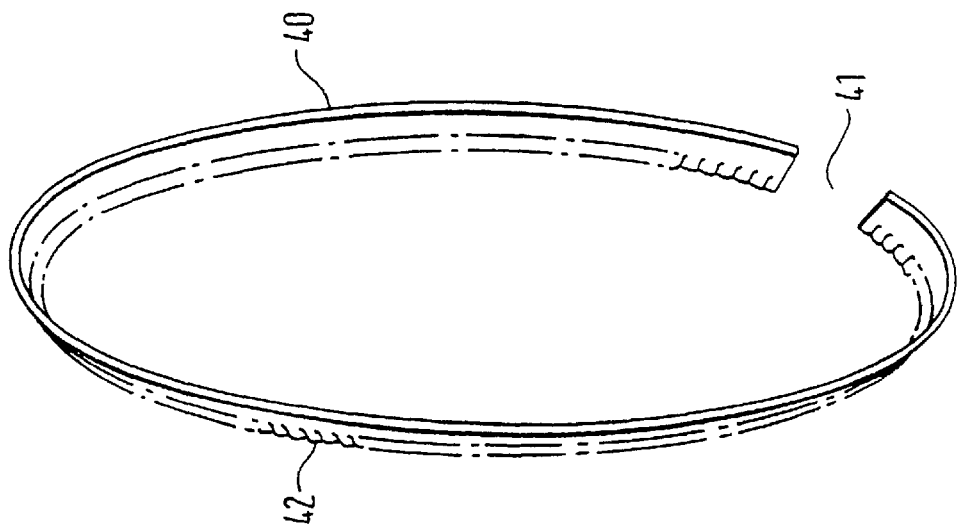
FIG. 4 shows a perspective view of the gripping ring of the coupling of FIGS. 1 to 3.
Figure 3:
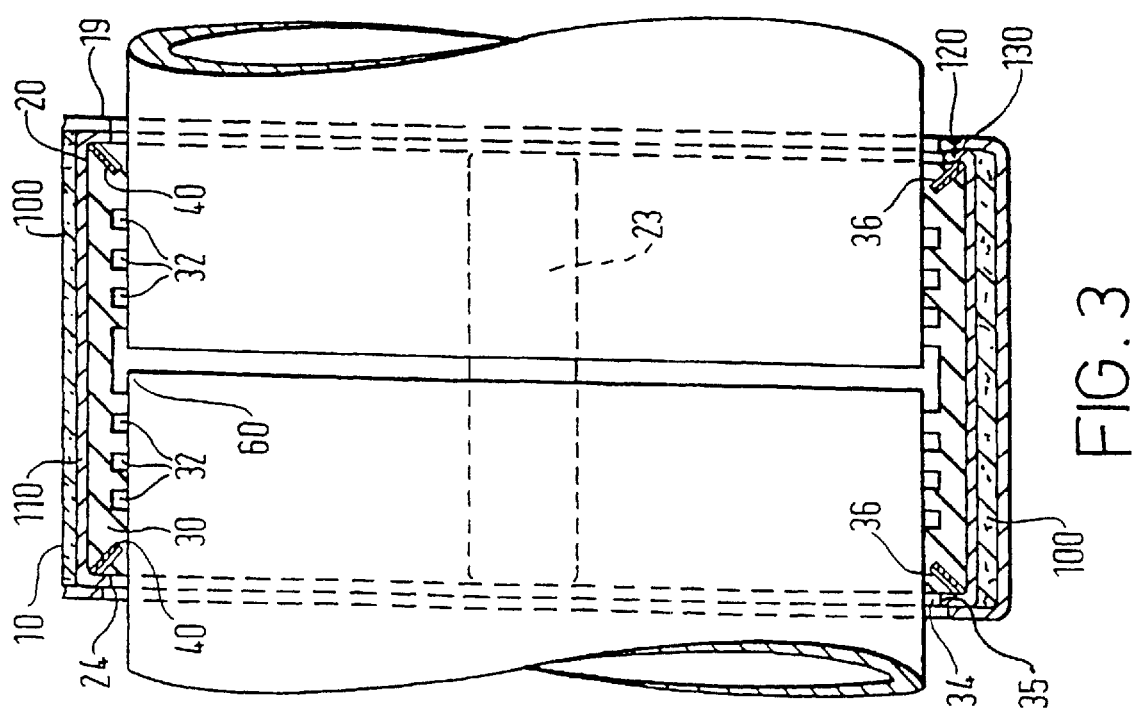
FIG. 3 shows a longitudinal section through the coupling of FIG. 1.
Figure 5:
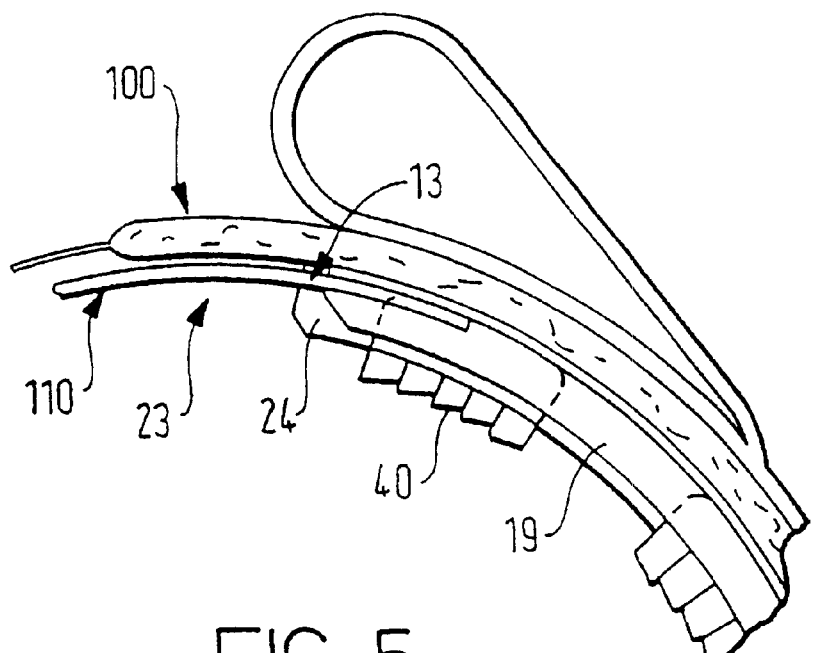
FIG. 5 shows a detailed transverse cross section of the coupling of FIGS. 1 to 4.

A pipe coupling 1 comprises an outer tubular casing 10, an inner tubular casing 20 and a sealing gasket 30. The outer tubular casing 10 is formed of rolled steel, with a longitudinal gap 13. The casing is folded back on itself at its free ends and welded at 14 to form loops 15 along opposite edges of the longitudinal gap 13. Pins 16 are inserted in the loops. Tensioning screws 17 pass through transverse holes in one of the pins 16 into tapped transverse holes in the other of the pins 16, so as to interconnect the two free ends of the outer casing 10. Slots 18 are cut in the loops 15 so as to provide clearance for the screws. The axial end margins of the casing 10 are bent inwardly at right angles to form radial flanges 19.

Figure 6:
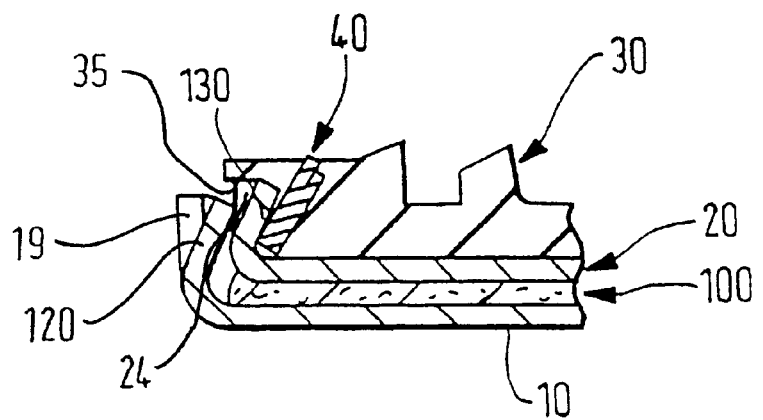
FIG. 6 shows a detail longitudinal section of the coupling of FIGS. 1 to 5.

The inner tubular casing 20 is of rolled steel and has a longitudinal gap 23. The axial end margins of the casing 20 are bent inwardly at right angles to form radial flanges 24. The casing 20 fits inside the outer casing 10, the axial length of the casing 20 being slightly less than that of the casing 10 so that the flanges 24 fit inside the respective flanges 19 and are axially spaced therefrom as illustrated in FIG. 6.

The technical advancement of the present invention has been achieved by forming the couplings of two circumferential casings, the outer casing 10 being formed deliberately larger than the inner casing 20 in order to accommodate an inserted fire shield 100.

The fire shield is a prepared strip of material cut to the circumference of the pipe inclusive of the thickness of the gasket and inner casing +1% for overlap and tolerance. The shaping of the outer and inner casings are smooth and identical so that a low friction surface is offered to the fire shield for easy sliding when closing the coupling. This is important because a coupling which has only one casing will not provide low friction surfaces between the steel casing and the rubber gasket or sealing sleeve. Other designs of couplings have components in the coupling casing which would snag or prevent the casing from closing up against the fire shield.

The outer and inner steel casings 10 and 20 are insulated one from the other by the layer of fire-resistant thermally-insulating material or fire shield 100. In previous couplings the gaps in the inner and outer casings have been set diametrically opposite in order to give a continuous steel band over the gasket. In the preferred embodiment of coupling according to the invention, the gaps 13 and 23 are in line and an extra bridging component 110 completes the circumferential band. This is in order to control the smooth sliding of the fire shield when closing the coupling. The extra bridging component is termed a "sub-bridge". The component 110 is secured to the inner side of the inner casing by spot welding.

To prevent the two casings from rotating relative to one another, anti-rotation notches 120 and 130 are provided in the end flanges 19 and 24 of the inner and outer casings which interengage at a point diametrically opposite the gaps 13 and 23 to lock the two casings together. It is important that the two casings do not rotate relative to one another. It is not possible to weld the casings together to prevent rotation because of the need to place the fire shield between the inner and outer casings, and also because there must be no thermal conductivity between the casings which a weld would allow.

The position of the fire shield 100 in the coupling is critical in achieving the correct resistance to temperature increase inside the casing, and also for the correct functioning of the coupling. When the fire shield is placed between the two casings the reduction in the temperature of the inner casing, in the event of a fire, compared with the arrangement when no fire shield is present, is sufficient to ensure that the inner casing conducts very little heat to the outer surface of the gasket. If, for example, the fire shield is placed directly against the rubber gasket, the shielding of the rubber from the heat is not so effective.

If a fire shield were to be positioned differently from the above description, it would have to be much thicker to achieve a similar temperature reduction and would therefore be more difficult to assemble, and more likely to ruck on closing. Even if the design of the outer and inner casings were different than to the arrangement described above, the temperature reduction could still be achieved by placing the fire shield between two sliding metallic components with a rubber gasket placed inside the inner casing.

From the preceding description, it may be further defined that in a coupling of our invention, the construction and assembly of the coupling is such that the product consists of an outer tubular casing with locking or tightening parts, and an inner casing which contains the gasket and any other components, such as anchoring rings, for gripping the pipe. During assembly, the complete integral inner casing is placed within the outer casing, between which a fire shield layer is inserted to insulate the two.

In couplings of other designs the gasket and other components, such as anchor rings, are placed directly within the outer casing; or with only a part of the gasket surrounded by a partial inner casing with anchor rings and supplementary components seated directly in the outer casing. In either instance, it may be established that there is a functional difference between these couplings and the coupling described in this specification in respect of establishing the mutually exclusive insularity of the casings between which the fire shield is placed. Any direct conductivity of heat between the components will detract from the performance of the coupling.

The layer of fire retardant material 100, may comprise a layer of between 3 mm and 5 mm thickness.

It is made of inorganic materials, preferably predominantely silica, and preferably with a micro porous structure. The material sold as Microtherm Grade Hydrophobic quilt is the presently preferred material. The material has high thermal insulation properties and is capable of withstanding high temperatures. The material has the following composition:

| | |
|---|---|
| $SiO_2$ | 64.68% |
| $TiO_2$ | 31.9% |
| $ZrO_2$ | 0.23% |
| $Al_2O_3$ | 2.37% |
| $Fe_2O_3$ | 0.33% |
| $Cr_2O_3$ | 0.07% |
| $P_2O_3$ | 0.02% |
| $B_2O_3$ | trace |

These figures are by weight.

The material is formed in a rectangular strip which is wrapped around the inner casing. The ends of the strip overlap in the region of the gaps 13 and 23.

The sub-bridge subtends an angle of between 30° to 40° at the pipe axis. It is secured to the inner casing on one side of the gap only and is arranged to overlap the inner casing by approximately equal amounts on either side of the gap in the tightened position.

The details of the gasket construction will now be described.

The sealing gasket 30 is of rubber formed from a length of flat extrusion which is rolled into a tube and joined by welding to form a complete cylinder. Alternatively, the rubber gasket may be moulded. The outer surface 31 of the gasket is smooth but the inner surface is formed with two sets of annular sealing ribs 32 which project inwardly. In the present embodiment there are three ribs in each set. Towards each end of the gasket the inner surface is stepped inwardly to form lands 33. The extreme ends of the gasket are formed by axial extensions of the inner part of the gasket, which extensions form end seals 34.

The gasket 30 fits inside the inner casing with the side flanges 24 fitting into a recess 35 formed behind the end seals 34.

A frustoconical slot 36 is formed in the outer surface of the gasket at each end of the gasket. The outer end of each slot lies at the axial end of the outer surface, the inner end of the slot lies close to the inner surface of the land 33. The slope of the slot is such that the inner end is nearer the axial middle of the gasket than the outer end.

A gripping device in the form of frustoconical ring 40 is located in the slot 36. The ring 40 is made of hard teeth 42 to penetrate through the gasket 30 at the bottom of the slot 36 and bite into the surface of the pipe, thereby providing locking of the coupling to the pipe against axial movement. The teeth are designed to make contact at approximately 5 mm centres around the circumference with a width of approximately 2 mm for each tooth, giving approximately 40% contact around the periphery of the pipe.

The end seals of extensions 34 are trapped between the flanges 19 and 24 on the inner and outer casings and the outer surfaces of the pipe ends to form end seals. Thus liquid and dirt is prevented from entering the coupling from outside.

By using a series of ribs a seal is achieved which is effective at high hydrostatic pressures, for example 16 bars. However, the axial length of the gasket that is exposed to the hydrostatic pressure is small compared with the overall length L of the coupling. This means that the tendency for the casing to bulge is less than with known couplings where almost the entire length of the gasket is exposed to the hydrostatic pressure of the fluid. As a result, the casing of the coupling of the present invention can be of lighter construction than an equivalent conventional coupling. For example, with a coupling for joining together two pipes of around 20 cm in diameter, (approximately 8 inches), the thickness of the outer casing can be approximately 3 mm, and the thickness of the inner casing approximately 25 mm. An advantage of using thinner metal is that the machinery required to form the casings is less expensive.

By locating the gripping ring in a slot in the outside of the gasket, the teeth are protected when the coupling is not in use and the coupling can be handled easily without a risk of the operator being cut. The resilience of the gripping ring and of the rubber of the gasket causes the teeth to retract back into the slot when the coupling is unfastened so that they no longer project through the inner surface of the gasket. The end seals keep out contamination which might enter the seals from outside and thereby affect performance. The use of low alloy, or high carbon, steel to produce hard teeth on the gripping ring renders them prone to corrosion. The end seals prevent the ingress of moisture, for example sea water, which could cause such corrosion.

The arrangement for holding the gripping rings is of simple construction and apart from the casings and the gasket, involves no separate parts. The entire structure is accommodated within the two pairs of annular flanges 19 and 24 which gives the total structure great strength and stability.

Because of the resilience in the gripping ring and the rubber, the clamping arrangement releases itself when the coupling is released.

The axial restraints operate independently of the gasket. The teeth do not cut through the gasket entirely, they merely pierce it at 5 mm intervals and so the coupling can be repeatedly used.

Because the toothed ring is placed in a wide slot it is free to find its own settlement. The outer edge is located in the angle between the flange and web portions of the inner casing, and the position of the inner edge is merely determined by the position where it bites into the pipe. As the coupling is tightened the teeth bite deeper into the pipe. The angle of approximately 45 degrees which is established between the ring and the pipe surface when the ring first bites is maintained as the coupling is tightened. The angle is in the inner casing bears directly against the outer edge of the gripping ring.

Because the toothed ring bears against the angle in the inner casing, the reaction forces from the toothed ring can be spread through the surface of the inner casing to the outer casing. This further reduces the tendency of the casing to bulge, compared to a single piece casing.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A pipe coupling for coupling together two pipes in a fluid-tight manner comprising:

a casing arrangement defining a longitudinal axis, said casing arrangement including an outer tubular casing and an inner tubular casing being disposed generally coaxially within and surrounded by said outer casing, said inner and outer casings each defining therein an axially extending gap, said gaps being circumferentially aligned with one another and a bridging component extends circumferentially across the respective said gaps;

an annular sealing gasket disposed within said casing arrangement to provide a fluid-tight seal between respective ends of the pipes;

a tensioning member which tightens the casing arrangement around the sealing gasket to seal same against the pipe ends; and a layer of fire-resistant thermal-insulating material sandwiched between said inner and outer casings, said layer extending circumferentially about said inner casing and along the entire axial extent thereof such that said inner and outer casings are thermally insulated from one another.

2. The pipe coupling of claim 1 wherein each of said inner and outer casings defines a pair of annular flanges which project radially inwardly from respective annular terminal edge portions of the respective said casing, each said annular flange of said inner casing being disposed axially inwardly of a respective said annular flange of said outer casing, and said layer extending along the entire axial extent of said inner casing as defined between the respective said flanges thereof.

3. The pipe coupling of claim 2 wherein said tensioning member is provided on said outer casing and tensions each of said inner and outer casings about said sealing gasket to clamp same against the pipe ends.

4. The pipe coupling of claim 3 wherein a pair of anchoring rings are disposed within respective slots defined in said sealing gasket adjacent opposite axial ends thereof, each said anchoring ring being configured to grip a respective pipe end and prevent relative axial movement between said coupling and the pipe ends.

5. The pipe coupling of claim 3 wherein said sealing gasket is disposed within said inner casing in surrounding relation with the pipe ends to sealingly engage same upon tensioning of the coupling, and said coupling is a self-contained annular coupling disposed in surrounding relation with ends of the respective pipes disposed in axially adjacent relation with one another.

6. The pipe coupling of claim 1 wherein each of said inner and outer casings defines a pair of annular flanges which project radially inwardly from respective annular terminal edge portions of the respective casing, each said annular flange of said inner casing being disposed closely axially adjacent, but being axially spaced from, a respective said annular flange of said outer casing such that said inner and outer casings are totally thermally insulated from one another.

7. The pipe coupling of claim 1 wherein said inner and outer casings do not thermally contact one another at least along the entire axial extent of said inner casing to minimize conduction of heat from said inner casing to said sealing gasket.

8. The pipe coupling of claim 1 wherein said layer has a thickness of about 3 mm to about 5 mm.

9. The pipe coupling of claim 1 wherein said outer casing is configured such that during tightening of said casing arrangement by said tensioning member, said outer casing readily slides over said layer to avoid wrinkling thereof.

10. The pipe coupling of claim 1 wherein said layer includes a prepared strip of material which is pre-cut to have a length similar to a circumference of the pipe ends inclusive of a thickness of both said sealing gasket and said inner casing with terminal ends of the strip of material being disposed in overlapping relation with one another.

11. The pipe coupling of claim 10 wherein the overlap of the terminal ends is approximately 1% of the length of said strip of material.

12. The pipe coupling of claim 1 wherein said bridging component is fixed to an inwardly facing surface of said inner casing by welding.

13. The pipe coupling of claim 1 wherein said bridging component subtends an angle of between about 30° and about 40° at a longitudinal axis of the pipe ends.

14. The pipe coupling of claim 1 wherein said layer is constructed of inorganic material.

15. The pipe coupling of claim 14 wherein said inorganic material is predominately silica.

16. The pipe coupling of claim 14 wherein said inorganic material has a micro-porous structure.

17. The pipe coupling of claim 1 wherein said inner and outer casings are constructed of thermally-conductive material.

18. The pipe coupling of claim 17 wherein said inner and outer casings are constructed of metal.

19. A pipe coupling for joining the ends of two pipes in a fluid-tight manner comprising:

an inner sleeve defining a longitudinal axis and an outer sleeve disposed in surrounding relation with said inner sleeve, said inner sleeve defining an outer circumferential surface which faces an inner circumferential surface defined by said outer sleeve, said inner and outer circumferential surfaces defining a radial space therebetween, each said inner and outer sleeve having a split configuration such that an axially extending gap is defined between longitudinally extending free edges of the respective said sleeve, said axially extending gaps of said inner and outer sleeves being circumferentially aligned with one another and a bridging member extends across the respective said gaps, said bridging member being fixed to said inner sleeve adjacent one said free edge thereof, said inner and outer sleeves each defining a pair of ring-shaped end edges which define terminal axial ends of the respective said sleeve and a pair of flanges project generally radially inwardly from the respective end edges of each said sleeve, each said flange of said outer sleeve being disposed axially adjacent and outwardly of a respective said flange of said inner sleeve;

an annular elastomeric seal disposed within said inner sleeve axially between said flanges thereof;

a tensioning arrangement associated with said inner and outer sleeves to adjust the distance between the respective pairs of free edges thereof and clamp said seal against the respective ends of the two pipes; and a layer of thermal insulating material disposed in the space between said inner and outer circumferential surfaces so as to be wrapped peripherally around said inner sleeve, the space between said inner and outer circumferential surfaces and said layer of insulating material disposed within the space extending along the entire axial extent of said inner sleeve as defined between said flanges thereof, said inner and outer circumferential surfaces being cylindrical in configuration and straight when viewed in longitudinal cross-section to prevent rucking of said layer of insulating material during tensioning of said inner and outer sleeves.

20. The pipe coupling of claim 19 wherein said straight configuration of said inner and outer circumferential surfaces enables said layer of insulating material to readily slidably move relative to said inner and outer circumferential surfaces during tensioning of said inner and outer sleeves.

21. The pipe coupling of claim 19 wherein said inner and outer circumferential surfaces are straight along the entire longitudinal extent of said coupling as defined between said ring-shaped end edges of said inner and outer sleeves.

22. A pipe coupling for joining the ends of two pipes in a fluid-tight manner comprising:

an inner sleeve defining a longitudinal axis and an outer sleeve disposed in surrounding relation with said inner sleeve, said inner sleeve defining an outer circumferential surface which faces an inner circumferential surface defined by said outer sleeve, said inner and outer circumferential surfaces defining a radial space therebetween, each said inner and outer sleeve having a split configuration such that an axially extending gap is defined between longitudinally extending free edges of the respective said sleeve, said axially extending gaps being circumferentially aligned with one another and a bridging member extending across the respective said gaps, said bridging member being fixed to said inner sleeve adjacent one said free edge thereof, said inner and outer sleeves each defining a pair of ring-like end edges which define terminal axial ends of the respective said sleeve, and a pair of flanges which project generally radially inwardly from the respective end edges of each said sleeve, each said flange of said outer sleeve being disposed axially adjacent and outwardly of a respective said flange of said inner sleeve;

an annular elastomeric seal disposed within said inner sleeve axially between said flanges thereof;

a tensioning arrangement associated with said inner and outer sleeves to adjust the distance between the respective pairs of free edges thereof and clamp said seal against the respective ends of the two pipes;

a layer of thermal insulating material disposed in the space between said inner and outer circumferential surfaces so as to be wrapped peripherally around said inner sleeve, said space and said layer of insulating material disposed therewithin extending along the entire axial extent of said inner sleeve as defined between said flanges thereof, said inner and outer circumferential surfaces being cylindrical in configuration and straight when viewed in longitudinal cross-section to prevent rucking of said layer of insulating material during tensioning of said inner and outer sleeves; and a pair of anchoring rings disposed within said seal adjacent opposite axial ends thereof, each said anchoring ring having a generally frustoconical configuration with a radially innermost edge defining teeth thereon for gripping a pipe end to prevent axial movement thereof relative to said coupling, said teeth penetrating an inner circumferential surface of said gasket during tensioning of said inner and outer sleeves.

23. A pipe coupling for coupling together two pipes in a fluid-tight manner comprising a tubular casing, a tubular sealing gasket located within said casing, and means for tensioning said casing around said gasket, said casing comprising an inner tubular casing and an outer tubular casing, a layer of fire-resistant thermally-insulating material disposed between said inner and outer casings, and said inner and outer casings each including anti-rotation notches which engage with one another to prevent said inner and outer casings from rotating relative to one another.

24. The pipe coupling of claim 23 wherein said inner and outer casings each define an axially extending gap therein, said gaps being circumferentially aligned with one another and said anti-rotation notches being provided in end flanges defined on said inner and outer casings at locations diametrically opposite said gaps.

25. The pipe coupling of claim 24 wherein said end flanges are annular in shape and project radially inwardly from respective terminal annular edge portions of the respective said casing, each said end flange of said inner casing being disposed axially inwardly of a respective said end flange of said outer casing, said sealing gasket being disposed within said inner casing between said end flanges thereof and said layer of thermally-insulating material being disposed between said end flanges of said outer casing and circumferentially surrounding said inner casing.

* * * * *